United States Patent [19]
Robinson

[11] 3,902,821
[45] Sept. 2, 1975

[54] HELICOPTER ROTOR

[75] Inventor: Franklin D. Robinson, Palos Verdes, Calif.

[73] Assignee: Summa Corporation, Culver City, Calif.

[22] Filed: Dec. 7, 1973

[21] Appl. No.: 422,895

[52] U.S. Cl. ............... 416/132; 416/23; 416/240; 416/242
[51] Int. Cl.² ......................................... B64C 27/46
[58] Field of Search ............ 416/132, 240, 242, 23, 416/24

[56] References Cited
UNITED STATES PATENTS

| | | | |
|---|---|---|---|
| 1,990,291 | 2/1935 | Larsen | 416/23 |
| 2,135,700 | 11/1938 | Cierva | 416/23 |
| 3,065,933 | 11/1962 | Williams | 416/242 |
| 3,167,129 | 1/1965 | Shultz | 416/23 UX |
| 3,173,490 | 3/1965 | Stuart | 416/223 |
| 3,525,576 | 8/1970 | Dorand | 416/23 X |
| 3,558,081 | 1/1971 | Williams | 416/242 X |
| 3,589,831 | 6/1971 | Lemnios et al. | 416/24 |

*Primary Examiner*—Everette A. Powell, Jr.
*Attorney, Agent, or Firm*—George F. Smyth

[57] ABSTRACT

A helicopter rotor having a plurality of fully articulated rotor blades with each blade having a fully cambered airfoil surface, a relatively stiff inboard portion, and a relatively flexible outboard portion. The rotor blades have an angle of twist which provides the outboard portions with a lower angle of attack than the inboard portions and the blades each have a trailing edge which includes a reflexed outer portion. The reflexed outer portion of each blade has a length along the blade axis ranging up to about one chord length and the reflexed outer portion has a curvature which imparts a moment to the blade about its aerodynamic center that tends to counteract negative aerodynamic pitching moments. The area of each reflexed outer portion is sufficient to generate a moment about the aerodynamic center of the blade which approximately balances the negative aerodynamic pitching moments generated in the outboard portion of the blade. The inboard portion of each blade is sufficiently stiff to resist negative aerodynamic pitching moments generated in the inboard portion without excessive twisting of the inboard portion.

19 Claims, 7 Drawing Figures

PATENTED SEP 2 1975 3,902,821
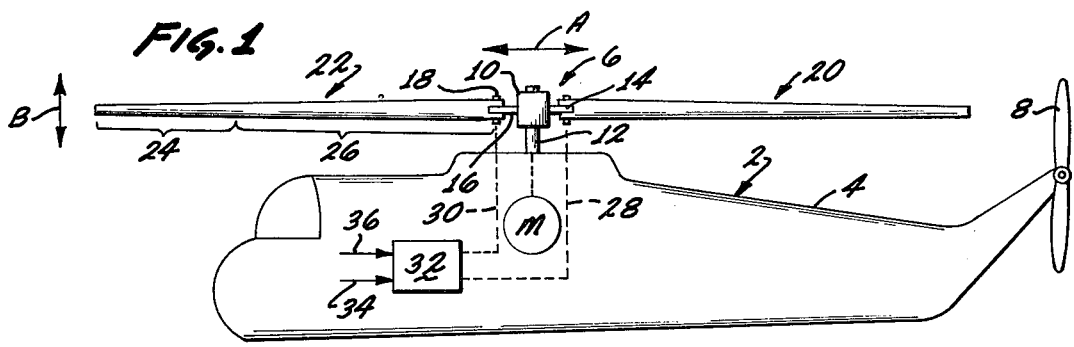
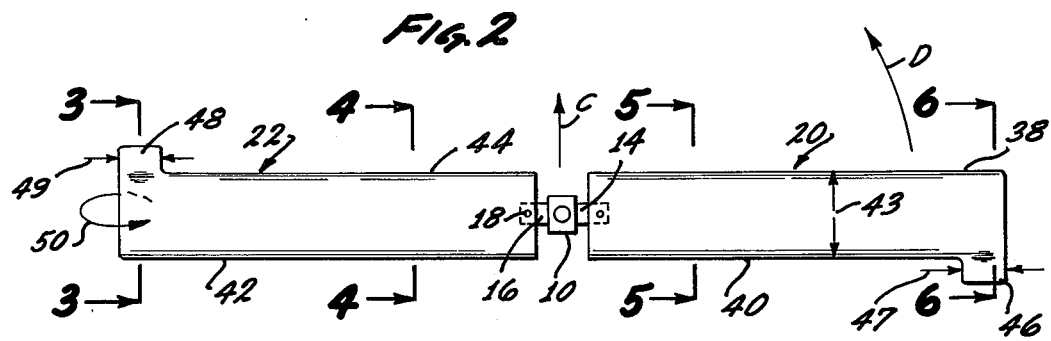
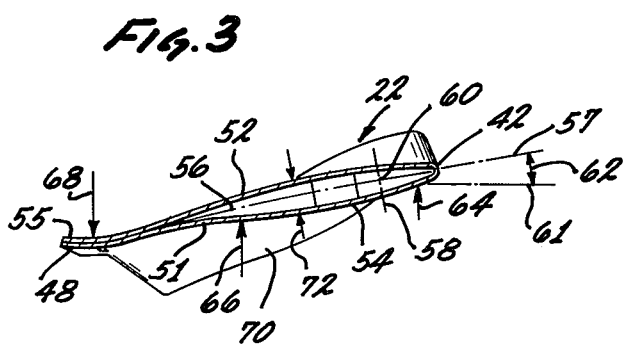
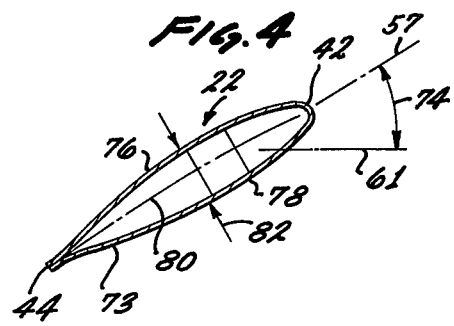
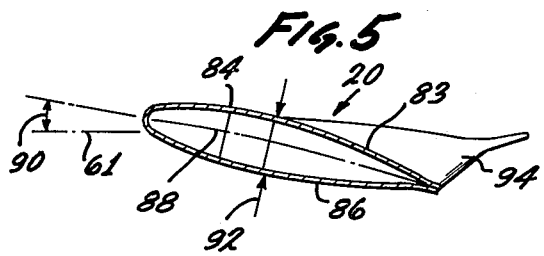
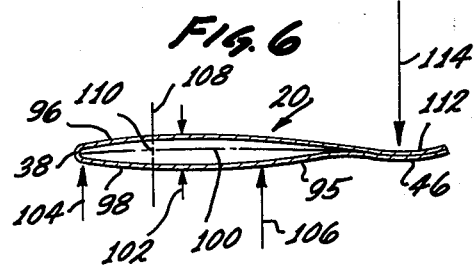
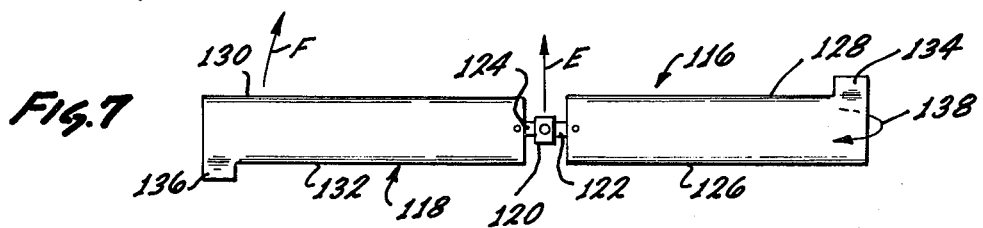

HELICOPTER ROTOR

BACKGROUND OF THE INVENTION

Fully cambered airfoil surfaces are known to develop a higher lift-to-drag ratio than airfoil surfaces having a symmetrical configuration. Fully cambered airfoil surfaces have been used in maximizing the lift coefficients for fixed wing aircraft. However, fully cambered airfoil surfaces have not been successfully used in the design of helicopter rotor blades because of the characteristic property of a fully cambered airfoil surface in producing negative aerodynamic pitching moments.

By way of background, the air speed of a helicopter rotor blade is constantly changing. Assuming a main rotor composed of two blades, at any given time during forward flight, one of the blades is advancing or moving in the direction of flight while the other blade is retreating or moving in a direction opposite to the direction of flight. The air speed of the advancing blade is equal to the air speed of the helicopter plus the speed of the advancing blade with respect to the helicopter. However, the air speed of the retreating blade is equal to the speed of the blade with respect to the helicopter minus the air speed of the helicopter.

To balance the lifting moments on the advancing blade with those on the retreating blade in maintaining aerodynamic stability, it is necessary to vary the angle of attack of the helicopter blades during each rotation of the rotor. The air speed of the retreating blade is less than that of the advancing blade. Thus, the angle of attack of the retreating blade is made greater than that of the advancing blade to increase lift forces on the retreating blade. During a complete revolution of the helicopter rotor, the advancing blade becomes the retreating blade and vice versa. The angle of attack of each rotor blade is, thus, varied during each revolution to decrease the angle of attack when the blade is the advancing blade and to increase its angle of attack when it becomes the retreating blade.

Each helicopter blade has a negative twist with outboard portions of the blade having a lower angle of attack than the inboard portions. Further, the air speed of a particular section of a helicopter blade is directly proportional to the distance of the section from the rotor axis. Outboard portions of the advancing blade which have the highest air speed may, thus, have an angle of attack of zero, i.e., with the chord of the outboard portion in alignment with the plane of rotation of the helicopter rotor. In this instance, the outboard portions of the advancing blade will not generate lift and lift forces generated by the advancing blade will be concentrated in the inboard portions of the blade.

The inboard portions of the retreating blade are closer to the axis of rotation of the rotor and have a relatively low air speed since the speed of rotation of the inboard portions may be more than offset by the air speed of the helicopter. Lift forces generated by the retreating blade are, thus, concentrated in the outboard portions of the blade where higher air speeds are sufficient to generate lift.

The lifting moments of the advancing and retreating blades must be equal and opposite to maintain the helicopter in a stable flight condition. Lift forces of greater magnitude are generated by the advancing blade than by the retreating blade. However, lift forces generated by the advancing blade are concentrated in the inboard portions of the blade while lift forces generated by the retreating blade are concentrated in the outboard portions of the blade. The larger lift forces generated by the advancing blade, thus, have a smaller moment arm and are positioned closer to the axis of the rotor, while lift forces generated by the retreating blade have a larger moment arm and are positioned further away from the rotor axis. In this manner, lifting moments generated by the larger lift forces on the advancing blade are counterbalanced by lifting moments generated by smaller lift forces on the retreating blade.

A characteristic property of a fully cambered airfoil surface is the development of a relatively low pressure area on the undersurface of the airfoil near its leading edge and a relatively high pressure area on the undersurface of the airfoil near its trailing edge. The approximate aerodynamic center of the airfoil section lies on its mid-line at a distance of one-quarter of a chord length from the leading edge of the section. The imbalance of moments generated by the low pressure area adjacent the leading edge and the high pressure area near the trailing edge produce a twist of the section about its aerodynamic center. The imbalance of moments produces a negative aerodynamic pitching moment which tends to twist the section to lower the leading edge of the section while raising the trailing edge. This tends to reduce the angle of attack of the section or to cause the section to have a negative angle of attack.

The magnitude of negative aerodynamic pitching moments produced by a fully cambered airfoil surface is directly related to the air speed of the airfoil surface and is independent of the lift generated by the surface. Thus, negative aerodynamic pitching moments produced by outboard portions of a fully cambered helicopter blade are of a much larger magnitude than negative aerodynamic pitching moments produced by the inboard portions which have a lower air speed. Also, the air speed of the advancing blade is much greater than that of the retreating blade. Thus, the negative aerodynamic pitching moments developed by a fully cambered advancing blade are of greater magnitude than the moments generated by a fully cambered retreating blade.

The maximum air speed and maximum negative aerodynamic pitching moments will, therefore, be developed in the outboard portions of the advancing blade. These negative pitching moments will be of a cyclical nature since a helicopter blade is both an advancing blade and a retreating blade during one complete revolution of the rotor. The cyclical nature of the twisting forces caused by negative aerodynamic pitching moments may impose great stresses on the blade, particularly in the outboard portions of the blade where the moments are of larger magnitude and where the blade is thinner. These forces may, in an extreme case, actually cause failure of the blade.

In addition, the cyclical generation of negative aerodynamic pitching moments by a fully cambered helicopter blade will make control of the helicopter more difficult. It is necessary that the angles of attack of the retreating and advancing blades be controlled to maintain the lift moments on the advancing and retreating blades in equilibrium. With outboard portions of the advancing blade undergoing violent twisting due to large negative aerodynamic pitching moments, it may be extremely difficult, if not impossible, to control the advancing and retreating blades so that the helicopter is stable. The negative aerodynamic pitching moments generated in the flexible outboard portions of the blades may change the angle of attack of the blades so that the lifting moments on the advancing blade may not be in equilibrium with lifting moments on the retreating blade.

One attempt at solving the problem of negative aerodynamic pitching moments in use of fully cambered airfoil surfaces for helicopter blades has been to reflex the entire trailing edges of the blades. This imparts a curvature to the trailing edges which produces a moment that tends to counteract or equalize the negative aerodynamic pitching moments. However, this attempted solution was not satisfactory since reflexing of the trailing edges greatly reduced the lift such that the fully cambered airfoil surface was then less desirable, from an aerodynamic standpoint, than a symmetrical airfoil surface.

As stated, it would be desirable to use a fully cambered airfoil surface in a helicopter rotor blade to take advantage of the superior lift-to-drag ratios developed by a fully cambered airfoil surface. However, to use a fully cambered airfoil surface in a helicopter rotor blade, it is first necessary that some means be devised for dealing with the problem of negative aerodynamic pitching moments. Any satisfactory solution to the problem of negative aerodynamic pitching moments must not materially reduce the superior lift-to-drag ratios of the fully cambered airfoil surface since this would defeat the very purpose of using a fully cambered surface.

SUMMARY OF THE INVENTION

In accord with the present invention, I have provided a helicopter rotor in which the airfoil surfaces of helicopter blades are fully cambered. Further, the configuration of the helicopter blades provides a counteracting moment which tends to equalize the negative aerodynamic pitching moments developed in the outboard portions of the blades. In providing a counteracting moment, the configuration of the helicopter blades is such that the counteracting moment is provided without any material decrease in the desirable lift-to-drag ratios of the helicopter blades.

In the present invention of a helicopter rotor with a plurality of fully articulated rotor blades, each of the rotor blades has a fully cambered airfoil surface, a relatively stiff inboard portion, and a relatively flexible outboard portion. Further, each blade has a negative angle to twist which provides the outboard portions of the blade with a lower angle of attack than the inboard portions of the blade.

Each blade has a trailing edge which includes a reflexed outer portion with the reflexed outer portion having a length along the axis of the blade which ranges up to about one chord length. In addition, each reflexed outer portion has a curvature which imparts a moment to the blade about its aerodynamic center that counteracts the negative aerodynamic pitching moments imparted to the flexible outboard portion of the blade by air flowing over the fully cambered airfoil surface.

The area of each reflexed outer portion is approximately sufficient to generate a moment about the aerodynamic center of the blade which balance negative aerodynamic pitching moments in the outboard portions of the blade. The inboard portion of each blade is sufficiently stiff to resist negative aerodynamic pitching moments generated in the inboard portion. Thus, cyclical twisting of the flexible outboard portion of the blade is minimized during rotation of the helicopter rotor.

The tip region of a retreating helicopter blade, for a distance along the blade of up to approximately one chord length, is immersed in a tip vortex. Within the tip vortex, the angle of attack of the retreating helicopter blade and its air speed generates a low pressure area on the upper surface of the blade. Due to the high pressure differential between the upper and lower surfaces of the blades, there is a flow of air from the lower surface of the blade to its upper surface to create the turbulent condition known as tip vortex.

Due to the turbulent conditions within the tip vortex, the tip region of the retreating blade which is immersed in the tip vortex does not generate lift. The reflexed outer portion of the retreating blade has a length along the blade axis of up to about one chord length and the reflexed outer portion is, therefore, immersed in the tip vortex where the retreating blade does not generate any significant lift. Thus, the reflexed outer portion of the retreating blade has little affect upon the lift generated by the retreating blade.

The generation of negative aerodynamic pitching moments is determined by air speed such that a blade section can generate negative aerodynamic pitching moments even though it is not generating any lift. Thus, by placing the reflexed outer portion of the retreating helicopter blade in the region of tip vortex, the reflexed outer portion produces a counteracting moment which tends to balance negative aerodynamic pitching moments produced in the outboard portion of the blade.

The problem of negative aerodynamic pitching moments is greatest in the advancing blade since the outboard portion of the advancing blade has a much higher air speed than the outboard portion of the retreating blade. Due to the relatively low angle of attack of the advancing blade and the negative twist of the blade which reduces the angle of attack of the outboard portion of the blade, the outboard portion of the advancing blade does not develop any significant amount of lift. By providing the reflexed outer portion of the advancing blade with a length of up to about one chord length, the reflexed outer portion produces a counteracting moment which tends to balance negative aerodynamic pitching moments in the outboard portion of the advancing blade. This is accomplished without any significant affect on the lift developed by the outboard portion of the advancing blade since the outboard portion does not develop any significant lift due to its low angle of attack.

When the helicopter is in a hover position, all the helicopter blades have the same angle of attack. In a hover condition, there is no advancing blade and no retreating blade and each of the helicopter blades has its tip portion immersed in a tip vortex resulting from the turbulent flow of air from the undersurface of the blade to its upper surface. Consequently, the outboard portions of the blades do not generate lift with the helicopter in a hover condition since the outboard portions of the blades are immersed in the tip vortex. Since the reflexed outer portions of each of the blades have a length of up to about one chord length, each of the reflexed portions is immersed in the tip vortex with the helicopter in a hover position. Thus, the reflexed outer portions of the blades provide a moment which counteracts negative aerodynamic pitching moments in the outboard portions without any significant reduction in the lift generated by the blades.

The relatively flexible outboard portion of each of the helicopter blades has a length which is equal to about 20 to 30% of the total length of the blade. Similarly, the relatively stiff inboard portion of each of the helicopter blades has a length which is equal to about 70 to 80% of the overall length of the blade. The helicopter blades may each have a negative angle of twist ranging up to about 8°. Thus, for example, when the root portion of the advancing blade has an angle of attack of about 8°, the tip of the advancing blade will have an angle of attack of zero degrees.

In addition to providing a helicopter rotor, the present invention provides helicopter blades in which a portion of the trailing edge of the outboard portion is reflexed to produce a moment about the aerodynamic center of the blade section which counteracts negative aerodynamic pitching moments. The reflexed outer portions each have a length of up to about one chord length along the axis of the blade and the reflexed outer portions each have an area that is approximately sufficient to generate a counteracting moment which will balance negative aerodynamic pitching moments generated in the outboard portion of the blade. The inboard portion of each blade is sufficiently stiff to resist negative aerodynamic pitching moments in the inboard portion without excessive twisting of the blade. Thus, negative aerodynamic pitching moments generated in the inboard portion of the blade are resisted by the blade itself. However, negative aerodynamic pitching moments generated in the relatively flexible outboard portion of the blade are resisted by the counteracting moment developed by flow of air over the flexed outer portion of the trailing edge.

Additionally, the present invention provides a helicopter which includes a helicopter rotor, driving means for the rotor, a rotor hub, and a plurality of fully articulated rotor blades hingedly connected to the rotor hub for cyclical pitch control of the rotor blades during rotation of the hub by the driving means. Each rotor blade has a fully cambered airfoil surface, a relatively stiff inboard portion, and a relatively flexible outboard portion. Moreover, each blade has an angle of twist which provides the outboard portion of the blade with a lower angle of attack then the inboard portion of the blade. Each blade has a trailing edge with the trailing edge including a reflexed outer portion having a length along the axis of the blade which ranges up to about one chord length. Each reflexed outer portion has a curvature which imparts a moment to the blade about its aerodynamic center that counteracts negative aerodynamic pitching moments.

The area of each reflexed outer portion is approximately sufficient to generate a moment about the aerodynamic center of the blade which balances negative aerodynamic pitching moments in the outboard portion of the blade. The inboard portion of each blade is sufficiently stiff to resist negative aerodynamic pitching moments generated in the inboard portion without excessive twisting of the inboard portion of the blade.

As a result of the present invention, cyclical twisting of the flexible outboard portions of the rotor blades is minimized during rotation of the rotor. This reduces stresses in the helicopter blades and permits cyclical pitch control to maintain the lifting moments on the advancing and retreating blades in equilibrium. This result is achieved without any significant impairment of the higher lift-to-drag ratios of the fully cambered airfoil surfaces of the helicopter blades.

BRIEF DESCRIPTION OF THE DRAWINGS

To further illustrate an embodiment of the invention, reference is made to the accompanying drawing in which:

FIG. 1 is an elevational view illustrating a helicopter having a main rotor with fully articulated blades and means for cyclical pitch control of the blades to maintain the lift moments generated by the advancing and retreating blades in equilibrium;

FIG. 2 is a top view of the helicopter rotor of FIG. 1 in which trailing edges of the outboard portions of the helicopter blades include a reflexed outer portion to generate a moment which counteracts negative aerodynamic pitching moments developed in the outboard portions of the helicopter blades;

FIG. 3 is a sectional view taken along the line 3—3 of FIG. 2 and illustrating the curvature of the reflexed outer portion of the retreating helicopter blade and the negative angle of twist of the blade;

FIG. 4 is a sectional view taken along the line 4—4 of FIG. 2 illustrating the inboard portion of the retreating helicopter blade which has a higher angle of attack and a greater depth than the outboard portion of the blade;

FIG. 5 is a sectional view taken along the line 5—5 of FIG. 2 through the inboard portion of the advancing helicopter blade with the inboard portion having a positive angle of attack and increased depth to resist negative aerodynamic pitching moments without excessive twisting of the inboard portion;

FIG. 6 is a sectional view taken along the line 6—6 of FIG. 2 through the flexible outboard portion of the advancing helicopter blade with the reflexed trailing edge of the outboard portion developing a relatively large counteracting moment to resist relatively large negative aerodynamic pitching moments generated in the outboard portion of the advancing blade, and FIG. 7 is a top view of a helicopter rotor, similar to FIG. 2, in which the helicopter rotor is rotated in a clockwise direction during forward flight in accord with the design practice for helicopters used in Russia and the European countries.

DETAILED DESCRIPTION

Turning to FIG. 1, a helicopter 2 includes a helicopter body 4 having a main rotor 6 and a tail rotor 8. The main rotor 6 includes a hub 10 affixed to a drive shaft 12 which is rotated by an engine (not shown). Helicopter blades 20 and 22 are connected to their respective blade shafts 14 and 16 about fully articulated hinges 18 which function in the manner of a universal joint. The fully articulated hinges 18 permit leading and lagging of the blades 20 and 22 during rotation as indicated by the arrows designated A and also flapping of the blades as indicated by the arrows designated B.

Each of the blades 20 and 22 includes a relatively flexible outboard portion 24 which may comprise the outer 20 to 30% of the helicopter blade and a more rigid inboard portion 26 which may comprise the inner 70 to 80% of the blade. During rotation of the main rotor 6, the pitch of the individual blades 20 and 22 may be cyclically controlled to maintain the lift moments generated by the blades in equilibrium.

During cyclical control of the pitch of the blades 20 and 22, the blade shafts 14 and 16 are rotated to change the angle of attack of the blades. A linkage designated 28 connects the shaft 14 with a control device 32 while a linkage 30 may connect the shaft 16 with the control device. The control device 32, in determining the proper pitch control for the blades 20 and 22, receives an air speed signal 34 and a stick signal 36. The pitch control of the blades 20 and 22 is, thus, dependent upon the air speed of the helicopter and the position of the control stick.

Use of fully articulated hinges between a helicopter blade and the rotor hub is well known. Likewise, the cyclical pitch control of helicopter blades to balance the lift moments generated by the blades is well known. Thus, the disclosure of the control device 32 and the articulated hinges 18 in FIG. 1 is done merely to illustrate the present invention in the background context of a helicopter having means to cyclically control the pitch of the rotor blades.

FIG. 2, which is a top view of the helicopter rotor 6 of FIG. 1, illustrates the rotation of the blades 20 and 22 with respect to the direction of flight of the helicopter which is indicated by the arrow C. The direction of rotation of the helicopter blades 20 and 22 is counterclockwise as indicated by the arrow D. As thus viewed, the blade 20 is the advancing blade while the blade 22 is the retreating blade.

The blade 20 includes a leading edge 38 and a trailing edge 40 while the retreating blade 22 includes a leading edge 42 and a trailing edge 44. The chord length 43 is the same for both of the blades 20 and 22 and may be uniform throughout the length of the blades.

The trailing edge 40 of advancing blade 20 includes a reflexed outer portion 46 having a length 47 which ranges from about one-half chord length up to about one chord length. Similarly, the trailing edge 44 of the retreating blade 22 includes a reflexed outer portion 48 having a length 49 which is the same as the length 47.

Due to the angle of attack of the retreating blade 22 and its air speed, the outer tip portion of the blade is immersed in a tip vortex indicated by the arrow 50. At the tip vortex 50, there is a turbulent flow of air from the undersurface of the blade 22 to its upper surface and the portions of the blade within the tip vortex, therefore, do not generate any appreciable lift. The region of the tip vortex may extend inwardly for about one chord length along the axis of the retreating blade 22. Thus, the reflexed outer portion 48 does not have any appreciable adverse affect on the lift generated by the retreating blade 22 since the length 49 of the reflexed portion places the reflexed portion within the tip vortex 50.

Turning to FIG. 3, which is a sectional view taken along line 3—3 of FIG. 2, an outboard section 51 of the blade 22 includes an upper airfoil surface 52 and a lower airfoil surface 54. The airfoil surface of the outboard section 51 is not symmetrical but is fully cambered. Thus, the midline curve 56 of the section is curved upwardly and designates the difference in curvature between the upper surface 52 and the lower surface 54. The reflexed outer portion 48 of blade 22 defines a surface 55 having a curvature which is opposite to the curvature of the midline curve 56.

The approximate aerodynamic center of the outboard section 51 lies at the intersection of the quarter chord length designated by line 58 with the midline curve 56 at point 60. As described previously, the retreating blade 22 has a positive angle of attack designated 62 with the angle of attack being measured between the plane 61 of the helicopter rotor and the chord line 57. A characteristic aerodynamic property of a fully cambered airfoil surface, such as the surface of outboard section 51, is that it develops a region of lower pressure on its undersurface adjacent to the leading edge of the section. This lower pressure region is designated by the arrow 64 positioned adjacent the leading edge 42 of the section 51. Additionally, a fully cambered airfoil surface generates a region of higher pressure on its undersurface adjacent its trailing edge and this is designated by the arrow 66. The effect of the lower pressure region 64 and higher pressure region 66 is to generate moments about the aerodynamic center 60 of the section 51. The force exerted by the higher pressure region 66 has a greater magnitude than that exerted by the lower pressure region 64 and the higher pressure region is spaced further from the aerodynamic center than the lower pressure region. Thus, the net effect is to generate a moment on the section 51 which tends to twist the blade 22 in a clockwise direction as viewed in FIG. 3 to lower the leading edge 42 and to reduce the angle of attack 62. This moment, which is a characteristic of a fully cambered airfoil surface, is termed a negative aerodynamic pitching moment.

The curvature of the surface 55 of reflexed outer portion 48 generates a counteracting moment designated by the arrow 68 which counteracts negative aerodynamic pitching moments developed in the outboard portion 24 of the blade 22. The area of the surface 55 is sufficiently large to generate a counteracting moment 68 that will counteract the summation of the negative aerodynamic pitching moments developed in the outboard portion 24. Thus, the outboard portion 24 of blade 22 does not undergo cyclical twisting since the negative aerodynamic pitching moments in the outboard portion are balanced by the counteracting moment 68.

The outboard portion 24 of helicopter blade 22 is relatively flexible and this is indicated by the relatively shallow depth 72 of section 51. The negative twist of the blade 22 is indicated by the background area 70 which illustrates the surface of the inboard portion 26 as it appears in looking at the blade from its end with the inboard portion having a larger angle of attack than the outboard portion 24.

FIG. 4 illustrates an inboard blade section 73 of the retreating blade 22. As indicated, the section 73 has a larger positive angle of attack 74 than the outboard section 51 which results from the negative twist in the retreating blade 22. The inboard section 73 includes an upper surface 76, a lower surface 78, and an upwardly curved midline 80 which is characteristic of a fully cambered airfoil surface. The inboard section 73 has a greater depth, designated 82, which permits the inboard portion 26 of blade 22 to resist negative aerodynamic pitching moments without excessive flexing of the blade. Thus, while negative aerodynamic pitching moments generated in the outboard portion 24 of blade 22 are resisted by the counteracting moment 68, the inboard portion 26 is sufficiently strong and rigid to resist twisting.

FIG. 5 is a sectional view taken along the line 5--5 of FIG. 2 through an inboard section 83 of the advancing blade 20. The inboard section 83 includes an upper surface 84, a lower surface 86, and an upwardly curved midline 88 which is characteristic of a fully cambered airfoil surface. since the advancing blade 20 has a higher air speed than the retreating blade 22, the advancing blade has a lower angle of attack, designated 90, at its inboard section 83. However, the inboard section 83 has a depth 92 which is sufficiently deep to make the inboard section relatively stiff. Thus, the inboard portion 26 of the advancing blade 20 is able to resist negative aerodynamic pitching moments without excessive twisting of the blade 20. The negative twist of the blade 20 is indicated by the background surface 94 which illustrates that the outboard portion 24 of the blade 20 has a lower angle of attack than the inboard portion 26.

FIG. 6 is a sectional view through an outboard section 95 of the advancing blade 22 with the outboard section including an upper airfoil surface 96, a lower airfoil surface 98, and an upwardly curved midline that is characteristic of a fully cambered airfiol surface. airfoil depth 102 of the outboard section 95 is relatively shallow so that the outboard portion 24 of the advancing blade 20 is relatively flexible. As illustreted, the outboard section 95 may have an angle of attack of zero in which the chord line of the section is in alignment with the rotor plane 61. Thus, the outboard section 95 does not generate lift.

As is characteristic of a fully cambered airfoil surface, a region of lower pressure designated by an arrow 104 is developed on the undersurface of section 95 adjacent the leading edge 38 while a region of higher pressure designated by an arrow 106 is developed on the undersurface of the section adjacent its trailing edge. The approximate aerodynamic center of the section 95 occurs at the intersection of its quarter chord length 108 with its midline 100 with the aerodynamic center being designated 110.

The net effect of the forces generated at the lower pressure region 104 and those generated at the higher pressure region 106 is to produce a negative aerodynamic twisting moment about the aerodynamic center 110 which tends to reduce the angle of attack of section 95 by twisting the section in a counterclockwise direction from that shown in FIG. 6. To resist the negative aerodynamic pitching moment, the reflexed outer portion 46 provides a surface 112 having a curvature which produces a counteracting moment illustrated by an arrow 114. The counteracting moment 114 is sufficiently large to counteract the summation of negative aerodynamic pitching moments developed in the outboard portion 24 of the advancing blade 20. The magnitude of the counteracting moment 114 is dependent upon the area of the surface 112 and, thus, the area of surface 112 is sufficiently large to produce the desired counteracting moment.

The present helicopter rotor may be incorporated into the helicopter in which the main rotor is rotated in a counterclockwise direction as illustrated by arrow D in FIG. 2. Helicopters designed in the United States provide rotation of the main rotor in a counterclockwise direction. Also, however, the present invention may be utilized in a rotor which is rotated in a clockwise direction. In helicopters constructed in Russia and in Europe, the main rotor is rotated in a clockwise direction in generating lift.

FIG. 7 illustrates a helicopter rotor which is rotated in a clockwise direction designated by an arrow F while the flight direction of the helicopter is designated by an arrow E. In the construction of FIG. 7, a retreating blade 116 and an advancing blade 118 are connected to a rotor hub 120 through blade shafts 122 and 124. The blades 116 and 118 may be fully articulated so as to be able to lead and lag and flap up and down and also means may be provided for cyclical pitch control of the blades 116 and 118 to maintain their lifting moments in equilibrium about the hub 120 in maintaining the aerodynamic stability of the helicopter.

The blade 116 may include a leading edge 126 and a trailing edge 128 while blade 118 also includes a leading edge 130 and a trailing edge 132. The trailing edge 128 of blade 116 may include a reflexed outer portion 134 while the trailing edge 132 of blade 118 may also include a reflexed outer portion 136. The reflexed outer portions 134 and 136 may have a length ranging up to about one chord length, as described previously with regard to the reflexed outer portions 46 and 48, and the reflexed outer portions each have an area which is sufficient to produce a counteracting moment which counteracts negative aerodynamic pitching moments generated in the flexible outboard portions of the blades 116 and 118.

As illustrated, the outer tip portion of retreating blade 116 is immersed in a tip vortex 138 which may encompass an outer portion of the blade ranging up to about one chord length. As described previously with regard to FIGS. 2–6, the reflexed portions 134 and 136, while counterbalancing negative aerodynamic pitching moments developed in the outboard portions of blades 116 and 118, do not have an adverse affect upon the lift generated by the blades 116 and 118. The reflexed outer portions 134 and 136, by having a length of up to about one chord length, do not detract from the lift capability of the blades 116 and 118. The outer portion of the advancing blade 130 for a distance of up to about one chord length does not generate appreciable lift because the angle of attack of the outboard portion of the advancing blade is at or near zero. Similarly, the reflexed portion 134 on the retreating blade 116 does not adversely affect the lift of the blade since the reflexed outer portion is immersed in the tip vortex 138 where the lift forces produced by the blade are negligible.

I claim:
1. A helicopter rotor comprising:
  a plurality of fully articulated rotor blades;
  each of said blades having a fully cambered airfoil surface, a relatively stiff inboard portion and a relatively flexible outboard portion;
  each of said blades having an angle of twist which provides the outboard portions of the blades with a lower angle of attack than the inboard portions of the blades;
  each of said blades having a tip and a trailing edge with the trailing edge including a reflexed outer portion positioned at said tip;
  each said reflexed outer portion having a length along the axis of the blade ranging up to about one chord length of the blade;
  each said reflexed outer portion having a curvature which imparts a moment to the blade about its aerodynamic center that counteracts negative aerody- namic pitching moments imparted to the blade by air flowing over its fully cambered airfoil surface;

the area of each of said reflexed outer portions being approximately sufficient to generate a moment about the aerodynamic center of the blade which balances negative aerodynamic pitching moments generated in the outboard portion of the blade by the flow of air over the fully cambered airfoil surface of the outboard portion;

the inboard portion of each of said blades being sufficiently stiff to resist negative aerodynamic pitching moments generated in the inboard portion without excessive twisting of the inboard portion;

the relatively stiff inboard portion of each of said blades having a length of about 70 to 80 percent of the length of the blade, and the relatively flexible outboard portion of each of said blades having a length of about 20 to 30 percent of the length of the blade, whereby cyclical twisting of the flexible outboard portions of the blades is minimized during rotation of the helicopter rotor without a material reduction in the lift-to-drag ratio of the fully cambered airfoil surfaces of the rotor blades.

2. The helicopter rotor of claim 1 wherein each of said blades have an angle of twist ranging up to about eight degrees.

3. The helicopter rotor of claim 2 wherein the airfoil surfaces of the rotor blades are contoured to generate lift when the rotor is rotated in a counterclockwise direction.

4. The helicopter rotor of claim 2 wherein the airfoil surfaces of the rotor blades are contoured to generate lift when the rotor is rotated in a clockwise direction.

5. The helicopter rotor of claim 1 wherein each reflexed outer portion has a length of about one-half to about one chord length.

6. The helicopter rotor of claim 1 wherein each reflexed outer portion has a length of about one-half chord length or less.

7. In a helicopter having a helicopter rotor, driving means for the rotor, a rotor hub, and a plurality of fully articulated rotor blades hingedly connected to the rotor hub for cyclical pitch control of the rotor blades to equalize lifting moments on the blades during rotation of the hub by the driving means, the improvement comprising:

each of said rotor blades having a fully cambered airfoil surface, a relatively stiff inboard portion and a relatively flexible outboard portion;

each of said blades having an angle of twist which provides the outboard portions of the blade with a lower angle of attack than the inboard portions of the blade;

each of said blades having a tip and a trailing edge with the trailing edge including a reflexed outer portion positioned at said tip;

each said reflexed outer portion having a length along the axis of the blade ranging up to about one chord length of the blade;

each said reflexed outer portion having a curvature which imparts a moment to the blade about its aerodynamic center that counteracts negative aerodynamic pitching moments imparted to the blade by air flowing over its fully cambered airfoil surface;

the area of each of the reflexed outer portions being approximately sufficient to generate a moment about the aerodynamic center of the blade which balances the negative aerodynamic pitching moments generated in the outboard portions of the blade by the flow of air over the fully cambered airfoil surface of the outboard portions;

the inboard portion of each of said blades being sufficiently stiff to resist the negative aerodynamic pitching moments generated in the inboard portions of the blade without excessive twisting of the inboard portion;

the relatively stiff inboard portion of each of said blades having a length which is about 70 to 80 percent of the length of the blade, and the relatively flexible outboard portion of each of said blades having a length which is about 20 to 30 percent of the length of the blade, whereby cyclical twisting of the flexible outboard portions of the rotor blades is minimized during rotation of the helicopter rotor without any material reduction in the lift-to-drag ratios of the fully cambered airfoil surfaces of the helicopter blades and with the pitch of the blades being cyclically controlled to maintain stability of the helicopter.

8. The helicopter of claim 7 wherein the length of the reflexed portion of each blade is about one-half to about one chord length of the blade.

9. The helicopter of claim 7 wherein each of said blades has an angle of twist ranging up to about eight degrees.

10. The helicopter of claim 7 wherein the helicopter rotor is rotated in a counterclockwise direction during flight of the helicopter.

11. The helicopter of claim 7 wherein the helicopter rotor is rotated in a clockwise direction during flight of the helicopter.

12. The helicopter of claim 7 wherein a rotor blade is an advancing blade and a rotor blade is a retreating blade at any given point in time during rotation of the helicopter rotor in flight of the helicopter;

said retreating blade having a positive angle of attack with the reflexed outer portion of the retreating blade immersed in a tip vortex;

said advancing blade having a lower angle of attack than said retreating blade, and the outboard portion of the advancing blade having a sufficiently low angle of attack to produce negligible lift, and the reflexed outer portion of the advancing blade positioned on the outboard portion of the advancing blade which produces negligible lift.

13. The helicopter of claim 7 wherein the length of the reflexed portion of each blade is about one-half chord length or less.

14. In a helicopter blade having a root, a tip, an airfoil surface with a leading edge and a trailing edge, and a twist of the blade between its root and tip which provides the leading edge adjacent the tip with a lower angle of attack than the leading edge adjacent the root, the improvement comprising:

said airfoil surface being fully cambered;

said blade having an inboard portion which is relatively stiff and an outboard portion which is relatively flexible;

said blade having a tip with a portion of the trailing edge of said outboard portion being reflexed at said tip;

said reflexed trailing edge extending inwardly from the blade tip for a length of up to about one chord length of the blade;

said reflexed trailing edge having a curvature which imparts a moment to the blade about its aerodynamic center which counteracts negative aerodynamic pitching moments imparted to the blade by air flowing over said fully cambered airfoil surface;

the area of the reflexed trailing edge being approximately sufficient to generate a moment about the aerodynamic center of the blade which balances negative aerodynamic pitching moments generated in the outboard portion of the blade;

the inboard portion of the blade being sufficiently stiff to resist negative aerodynamic pitching moments generated in the fully cambered airfoil surface of the inboard portion without excessive twisting of said inboard portion;

the relatively stiff inboard portion of the blade having a length of about 70 to 80 percent of the length of the blade, and the relatively flexible outboard portion of the blade having a length of about 20 to 30 percent of the length of the blade.

15. The helicopter blade of claim 14 wherein said reflexed trailing edge extends inwardly from the blade tip for a length of about one-half to about one chord length of the blade.

16. The helicopter blade of claim 14 wherein the angle of twist of the blade between its root and its tip ranges up to about eight degrees.

17. The helicopter blade of claim 14 wherein the airfoil surface of the blade is contoured to generate lift when the blade is rotated in a counterclockwise direction.

18. The helicopter blade of claim 14 wherein the airfoil surface of the blade is contoured to generate lift when the blade is rotated in a clockwise direction.

19. The helicopter blade of claim 14 wherein said reflexed trailing edge extends inwardly from the blade tip for a length of about one-half chord length or less.

* * * * *